US005817248A

United States Patent [19]

Forlini

[11] Patent Number: 5,817,248

[45] Date of Patent: Oct. 6, 1998

[54] MOLD FOR STRUCTURAL BLOCKS

[76] Inventor: Emidio J. Forlini, 120 Edmonds Ave., Havertown, Pa. 19083

[21] Appl. No.: 769,881

[22] Filed: Dec. 19, 1996

Related U.S. Application Data

[63] Continuation of Ser. No. 538,198, Oct. 3, 1995, abandoned, which is a continuation of Ser. No. 248,194, May 24, 1994, abandoned.

[51] Int. Cl.[6] .......................... A23G 9/00; B41B 11/56; B29C 33/00

[52] U.S. Cl. .......................... 249/68; 249/102; 249/104; 249/112; 249/144; 249/161; 249/165; 249/170; 249/172; 249/187.1

[58] Field of Search .......................... 249/102, 104, 249/112, 161, 165, 170, 172, 187.1, 67, 68, 142, 144; 425/444

[56] References Cited

U.S. PATENT DOCUMENTS

| | | | |
|---|---|---|---|
| 139,050 | 5/1873 | Derrom | 249/172 |
| 156,470 | 11/1874 | Warner | 249/172 |
| 887,814 | 5/1908 | Johnson | 249/172 |
| 1,752,671 | 4/1930 | Knight | 50/437 |
| 2,283,968 | 5/1942 | Bunch | 249/112 |
| 2,442,685 | 6/1948 | Gretter | 249/98 |
| 2,807,071 | 9/1957 | Francis et al. | 249/172 |
| 3,348,802 | 10/1967 | Corbett | 249/163 |
| 3,380,121 | 4/1968 | Chittenden et al. | 249/98 |
| 3,380,703 | 4/1968 | Eastron | 249/172 |
| 3,601,355 | 8/1971 | Fleck | 249/148 |
| 3,797,980 | 3/1974 | Budhan | 425/84 |
| 4,343,453 | 8/1982 | Rodon | 249/120 |
| 4,639,345 | 1/1987 | Olsen | 264/226 |
| 4,790,508 | 12/1988 | Henderson et al. | 249/11 |
| 4,842,241 | 6/1989 | Fitzgerald et al. | 249/50 |
| 4,869,660 | 9/1989 | Ruckstuhl | 425/195 |
| 4,889,311 | 12/1989 | Anglin | 249/68 |
| 5,062,610 | 11/1991 | Woolford et al. | 249/52 |
| 5,098,059 | 3/1992 | Sawyer | 249/16 |

FOREIGN PATENT DOCUMENTS

| | | |
|---|---|---|
| 8502696 | 5/1987 | Netherlands . |

*Primary Examiner*—Nina Bhat
*Attorney, Agent, or Firm*—Robert S. Lipton, Esq.; Lipton, Weinberger & Husick

[57] ABSTRACT

A mold designed to be operated easily by one person to form large blocks. Generally, the walls of the mold are attached to the base with a pivoting assembly such that the walls of the mold fall away from the molded material after hardening. Levers and fulcrums of various designs are used to facilitate the mold wall movements. Additionally, quick release and tightening mechanisms are used to secure the mold walls. Also, the wall of the mold can be designed to incorporate patterns such that the blocks formed in the molds can interlock when stacked, forming a very sturdy wall. Further, specially designed inserts can be utilized to quickly modify the mold.

5 Claims, 8 Drawing Sheets

MOLD FOR STRUCTURAL BLOCKS

This is a continuation of application Ser. No. 08/538,198 filed on Oct. 3, 1995 which was a continuation of application Ser. No. 08/248,194 filed on May 24, 1994 , both abandoned.

BACKGROUND OF THE INVENTION

The present invention relates to a mold for forming blocks useful for structural purposes, such as walls, and more particularly to such blocks which are made of poured concrete and configured so as to interlock to form a sturdy wall construction.

Blocks used to construct sturdy walls can be large and heavy. For example, retaining walls for earth embankments, or for the storage of sand, gravel, or the like, need to be quite sturdy. These walls can be made of many smaller blocks or fewer but larger blocks. Because of the application, often walls are made from larger, heavy blocks. Additionally, the walls of these blocks are often configured so the blocks can interlock and add strength to the wall.

The manufacture of the larger blocks poses unique problems. One problem is designing the mold so it can be assembled and taken apart efficiently. Another problem is building a mold strong enough to contain the block material during pouring and hardening. A third problem is designing the mold so the large, heavy block with interlocking configurations can be removed efficiently.

The prior art for molding concrete blocks with configurations describes a mold formed by a table top and moveable walls. The walls are mounted on the table. In one version, the walls are hinged where they meet except for one corner that has a latch to keep that corner closed during the molding operation.

The prior art molds, however, while fine for smaller concrete blocks are inadequate for the demands of larger blocks. Maneuvering the mold walls of a 2'× 2'×6' concrete mold is a difficult and strenuous operation. The size of the walls makes them awkward to handle. Additionally, the ease of maneuverability is diminished as the walls become heavier due to their size. Further, the great initial force required to separate the walls of the mold from the block in the mold creates more concerns.

SUMMARY OF THE INVENTION

Accordingly, it is an object of the present invention to provide a mold which overcomes one or more of the drawbacks of the prior art.

It is another object of the invention to provide a mold which is able to be assembled and disassembled quickly by one person.

It is another object of the invention to provide a mold which is able to quickly release the hardened material.

It is another object of the invention to provide a mold which is able to allow one person to overcome easily the initial force required separate the mold walls from the molded material.

It is another object of the invention to provide a mold which allows for configurations on the walls of the hardened material.

These and other objects which will appear are achieved in accordance with the present invention as follows.

A mold embodying the invention is generally a rectangular block shape with contoured sides when the mold is in the closed position. The walls of the mold are attached to the base with pivoting assemblies that allow the walls to swing down from a closed position to a block release position. Often, the pivot point of the assemblies are located below the plane formed by the top surface of the mold base. Additionally, stops are located to define the block release position of the walls. Other purposes of the stops are to prevent the heavy from having to be moved a greater distance than is required to use the mold and to prevent the mold wall from falling to a horizontal position, potentially harming the mold attendant.

The walls of the mold are designed to accept a lever to aid in moving the walls from the closed to the block release position. The lever can also be used with a plunger assembly, mounted in the wall, that aids in pulling the wall away from the side of the block in the mold. Additionally, locking compression mechanisms are used to pull and snugly lock two adjoining walls together. Some of the mold walls also have guides to help locate a wall relative to its adjoining wall and to prevent the walls from separating during the molding process. Additionally, pin holders are placed on the inner surface of the wall to allow pins to be molded into a block such that the head of the pin is in a recess of the block. Further, a flat insert can be placed against an inside surface of a wall to create a smooth, instead of contoured, side to the block or an insert can be placed in the mold to segment the mold.

BRIEF DESCRIPTION OF THE DRAWINGS

For further details, reference is made to the discussion which follows, in light of the accompanying drawings, wherein.

DETAILED DESCRIPTION OF THE PREFERRED EMBODIMENTS

Figure 1:
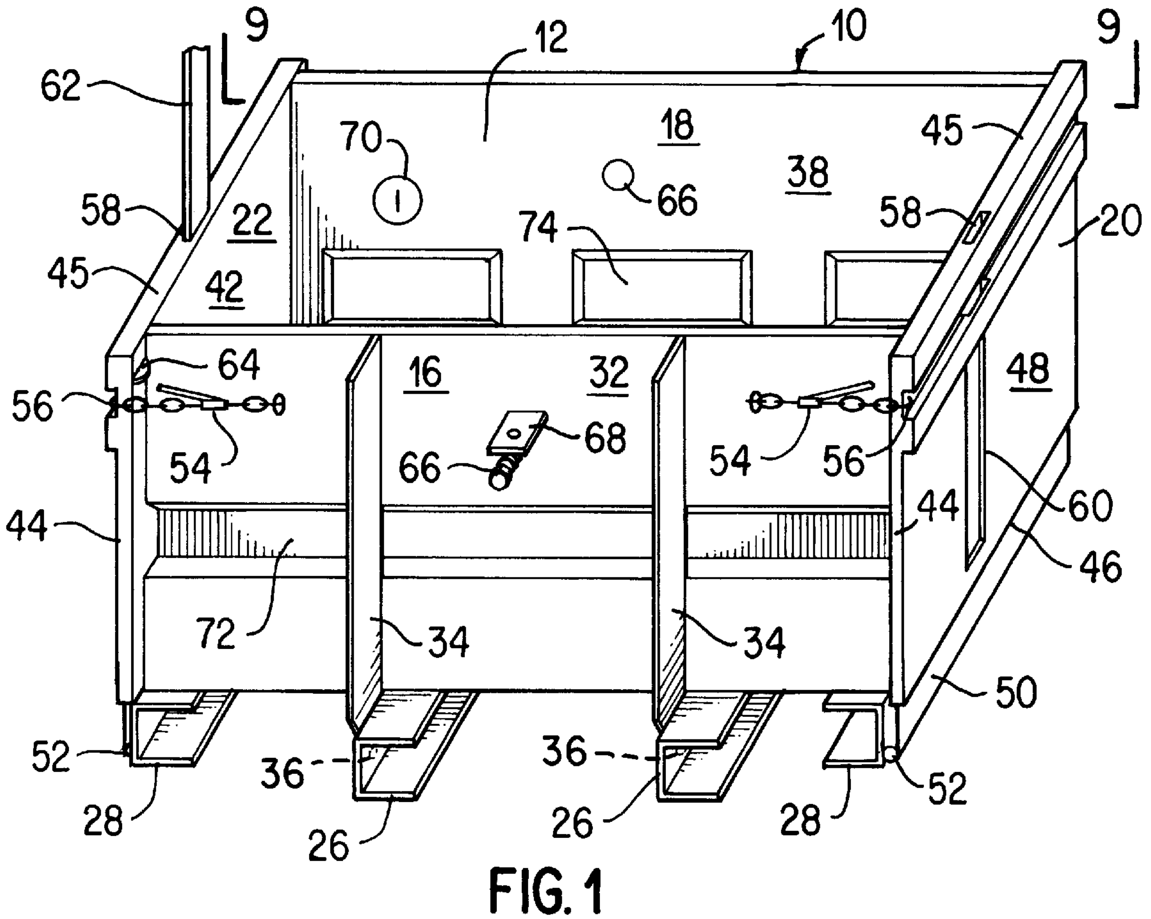
FIG. 1 shows the mold in the closed position in isometric view seen from above and from the front.
Figure 2:
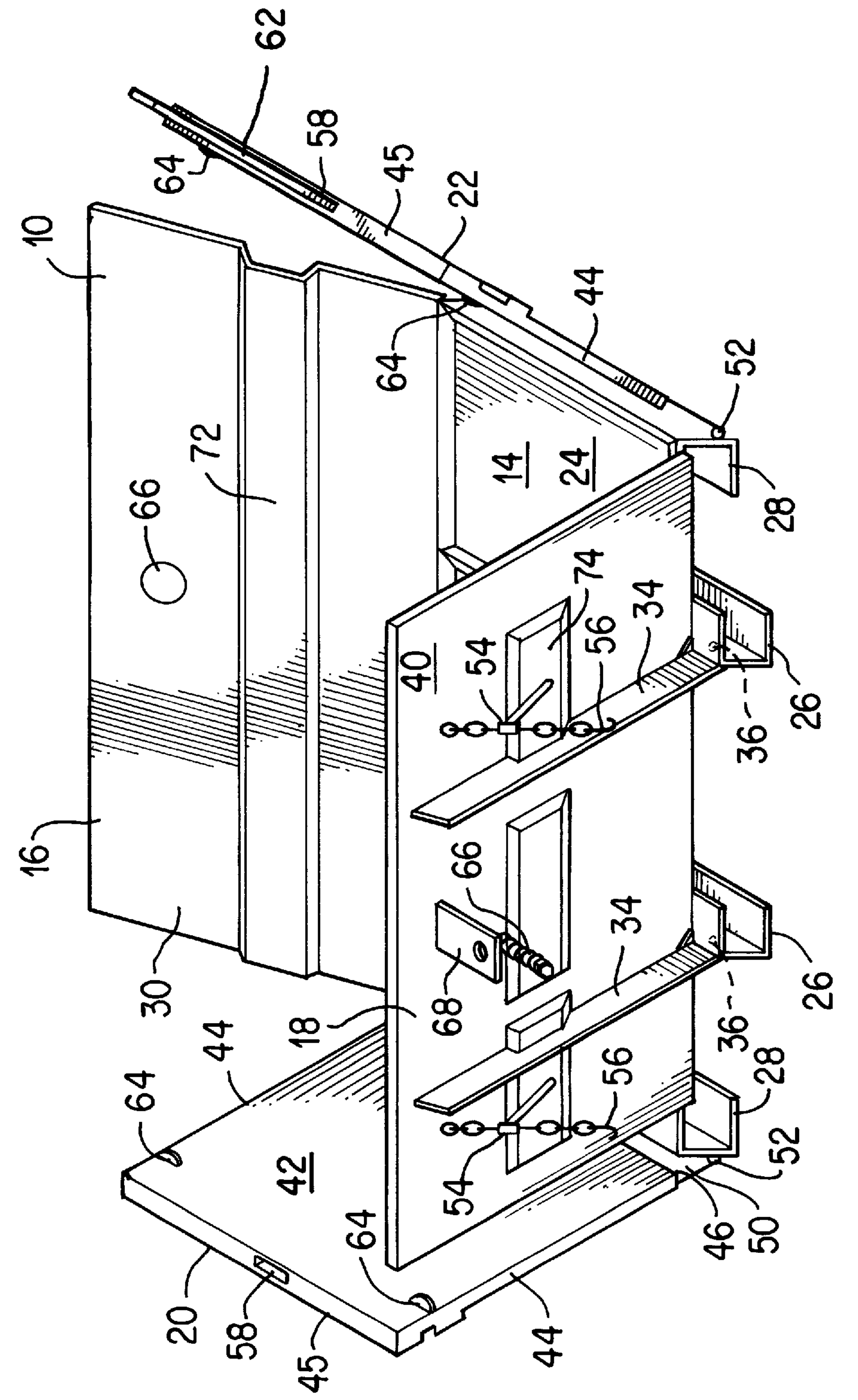
FIG. 2 shows the mold in the block release position in isometric view seen from above but from the back.

Referring now jointly to FIGS. 1 and 2, these both show the mold 10. FIG. 1 shows mold 10 in the closed position and FIG. 2 shows the mold 10 in the block release position. When the mold 10 is in the closed position, mold cavity 12 is formed. Mold 10 is comprised of base 14 and walls 16, 18, 20, and 22. The base 14 has a top surface 24, two inner footings 26 and two outer footings 28 mounted underneath base 14. The footings 26 and 28 are metal u-channels mounted substantially parallel with opposite ends of base 14 and the inner footings 26 mounted between the outer footings 28 and substantially trisecting the base 14.

Continuing to refer to FIGS. 1 and 2, the mold 10 has a wall 16 mounted to the base 14 on a side that is perpendicular to footings 26 and 28. Wall 16 has an inside surface 30 and an outside surface 32. Mounted vertically to the outside surface 32 are two wall supports 34 which are pivotally attached to the inner footings 26 through pins 36. On the opposite side of base 14 from wall 16 is wall 18 with an inside surface 38 and an outside surface 40. Mounted vertically to wall 18 are more wall supports 34 which are pivotally attached to inner footings 26 through pins 36. Positioned opposite each other on the other two ends of base 14 are wall 20 and 22. Both walls have inside surfaces 42, side edges 44, a top edge 45, a bottom edge 46 and an outside surface 48. A plate 50 is mounted along the entire length of the bottom edge 46 of both wall 20 and 22 and positioned in the plane formed by the walls 20 and 22. The plates 50 are pivotally mounted to the outer footings 28 through a rod and tube assembly 52.

Continuing to refer to FIGS. 1 and 2, the walls 20 and 22 are arranged so walls 16 and 18 butt-up against the inside surfaces 42 when the mold 10 is in the closed position.

Continuing to refer to FIGS. 1 and 2, mounted on outside surface 32 are two locking compression mechanisms 54, one located near where wall 20 meets wall 16 and one located near where wall 22 meets wall 16. The locking compression mechanisms 54 also have a hook 56. The hooks 56 are placed on edges 44 and the locking compression mechanism 54 is tightened to draw up walls 20 and 22 and lock into the closed position. The locking compression mechanism 54 allows for quick assembly of the mold 10 to the closed position and quick release of the mold walls 16, 18, 20, and 22. There is a similar arrangement on wall 18. Details of the application of the locking compression mechanism 54 are in FIGS. 6A and 6B.

Continuing to refer to FIGS. 1 and 2, walls 20 and 22 have openings 58 on the top edge 45. The openings 58 correspond with channels 60 mounted vertically on the outside surface 48. The openings 58 and the channels 60 are designed to accept lever 62. After inserting lever 62 into one of the openings 58 and channels 60, the wall can easily be moved from the closed position to the block release position and back again using the lever 62.

Continuing to refer to FIGS. 1 and 2, the inside surfaces 42 of walls 20 and 22 have guides 64. The guides 64 are positioned such that when mold 10 is in the closed position, a guide 64 snugly fits against either outside surface 32 or 40. The guides 64 are also used to guide the walls 16, 18, 20, and 22 together when the mold 10 is being assembled to the closed position. Additionally, the guides 64 add support to the mold 10 during the block manufacturing operation.

Continuing to refer to FIGS. 1 and 2, on walls 16 and 18 there are plungers 66, arches 68 and on wall 18 there are pin holders 70. The plungers extend through the walls 16 and 18. An arch 68 is mounted on the outside surfaces 32 and 40 above the plunger 66. The plunger 66/arch 68 combination is used to move the walls 16 and 18 from the closed position to the block release position. See description of FIGS. 5A and 5B for details.

Continuing to refer to FIGS. 1 and 2, on wall 16 there is pattern 72 and on wall 18 there is pattern 74. Pattern 72 is a ridge protruding into the mold cavity 12 positioned substantially midway between the top and bottom of wall 16 and extending the length of wall 16. Pattern 72 is such that the mold 10 can form a block with an indentation on one face running the length of the block. Pattern 74 is three rectangular protrusions from the mold cavity 12, running length wise and in series, positioned substantially midway between the top and the bottom of wall 18. Pattern 74 is such that the mold 10 can form a block with three ridges on one face. Additionally, patterns 72 and 74 complement each other such that if two blocks were formed with mold 10, the ridges formed by pattern 74 would inter-engage with the indentation formed by pattern 72 and the adjacent faces of the two blocks would mate. Additionally, the sides of the ridges formed by pattern 74 and the sides of the indentation formed by pattern 72 are tapered. One purpose of the tapered sides is to facilitate the movement of the walls 16 and 18 from the closed to the block release position. Another purpose of the tapered sides is to facilitate the inter-engagement of the blocks when they are stacked to form a wall.

Figure 3A:
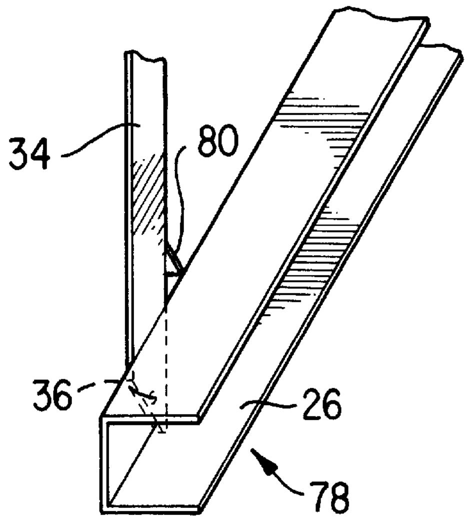
FIGS. 3A and 3B show a first pivot assembly in the closed and block release positions.
Figure 3B:
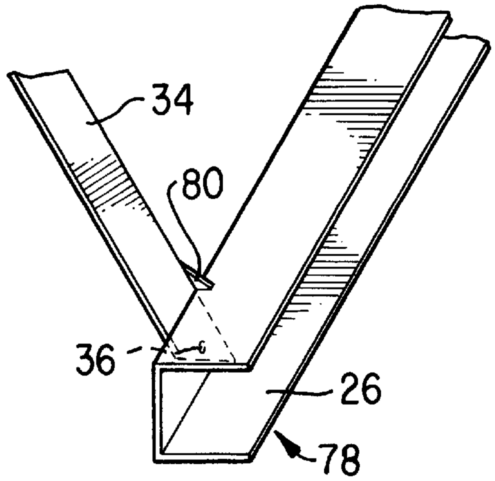

Continuing to refer to FIGS. 1 and 2, pin holders 70 are mounted to the inside of wall 18. Pin holders 70 are commercially available half spheres of plastic that hold a pin in the material being molded. The half sphere forms a recess in the material, which allows the pin head to be exposed while being below the surface of the block. The pins are later used to lift and move the finished block with a conventional lifting hook (not shown). There are two pin holders 70 for each block and the pin holders 70 are typically placed on the wall that forms the top surface of FIGS. 3A and 3B show details of the pivot assembly 78 for walls 16 and 18. FIG. 3A shows the pivot assembly 78 in the closed position and FIG. 3B shows the pivot assembly 78 in the block release position. The wall support 34 pivots on pin 36 from the closed position to the block release position. The pin 36 is mounted though a hole near the bottom of wall support 34 and a hole on the side and near the end of inner footing 26. A stop 80 is used to define the block release position. The stop 80 is mounted to the wall support 34. Wall support 34 (and the wall 16 and 18) move out from the closed position until the stop 80 contacts the inner footing 26, defining the block release position.

Figure 4A:
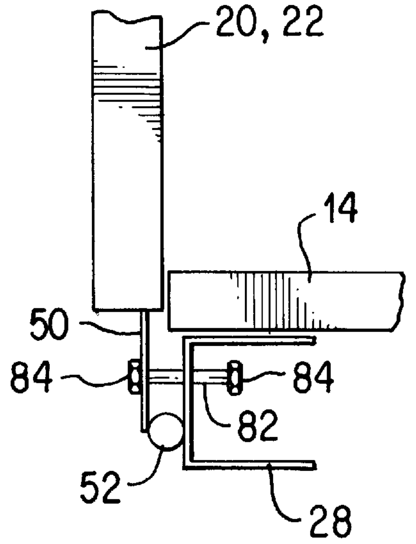
FIGS. 4A and 4B show a second pivot assembly in the closed and block release positions.
Figure 4B:
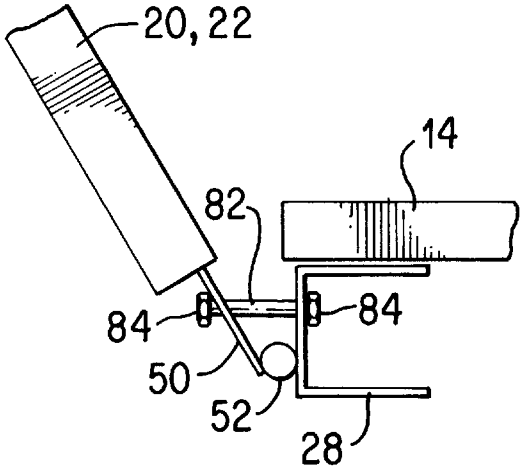

FIGS. 4A and 4B show details of the pivot assembly for walls 20 and 22. Plate 50 is attached to outer footing 28 with a rod and tube pivot assembly 52. Plate 50 is also attached to the bottom of walls 20 and 22. Rod 82 runs through plate 50 and outer footing 28. On either end of rod 82 are nuts 84. The nuts 84 are of a larger diameter than the holes rod 82 runs through. When opening up mold 10, walls 20 and 22 move from the closed position until the nuts 84 contact plate 50 and outer footing 28, defining the block release position.

Figure 5A:
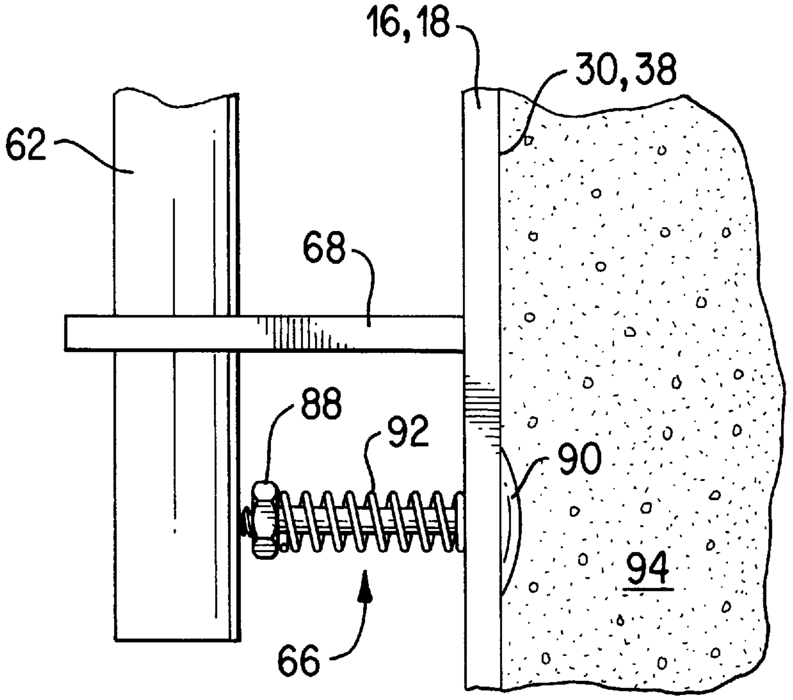
FIGS. 5A and 5B show a plunger assembly in the resting and depressed positions.
Figure 5B:
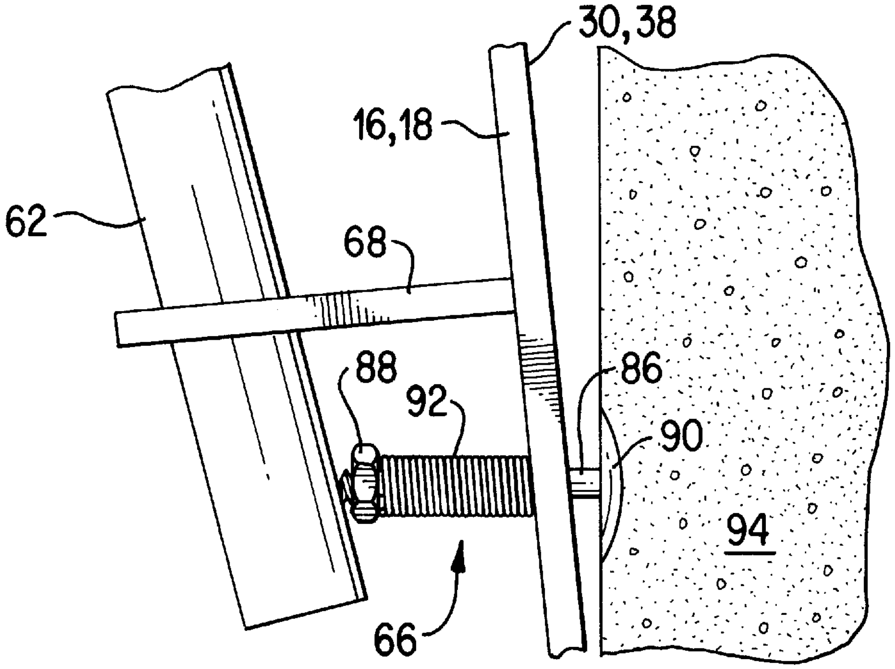

FIGS. 5A and 5B show details of the plunger assembly 66 in the resting and depressed position respectively. The plunger assembly 66 is comprised of a rod 86 on which a nut 88, a head 90 and a spring 92 is mounted. The plunger assembly 66 is mounted through wall 16 or 18 such that the head 90 rests on the inside surface 30 or 38, the rod 86 is attached to the head 90 perpendicular to the plane formed by the head 90 and runs through the wall 16 or 18. On the other end of the rod 86 is the nut 88. The spring 92 is around the rod 86 with one end of the spring pressing against the outside surface of the wall the plunger 66 is mounted through and the other end of the spring is pressing against the nut 88. This arrangement of the plunger 66 forces the head 90 to rest against the inside surface of the wall the plunger 66 is mounted through. However, when lever 62 is placed through arch 68 and pulled, the lever 62 depresses the plunger assembly 66, and pulls the wall away from the hardened block 94 in the mold 10. The longer the distance from arch 68 to the place on lever 62 that the person opening mold 10 places her hands compared to the distance from the end of plunger 66 to arch 68, the easier it will be to start moving the wall.

Figure 6A:
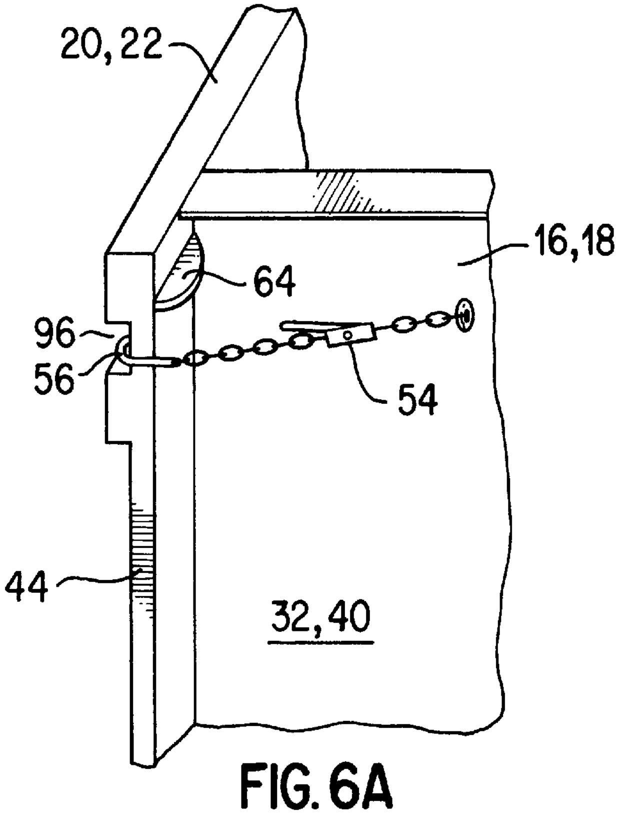
FIGS. 6A and 6B show details of the wall guide and locking compression mechanism in the closed and block release position.
Figure 6B:
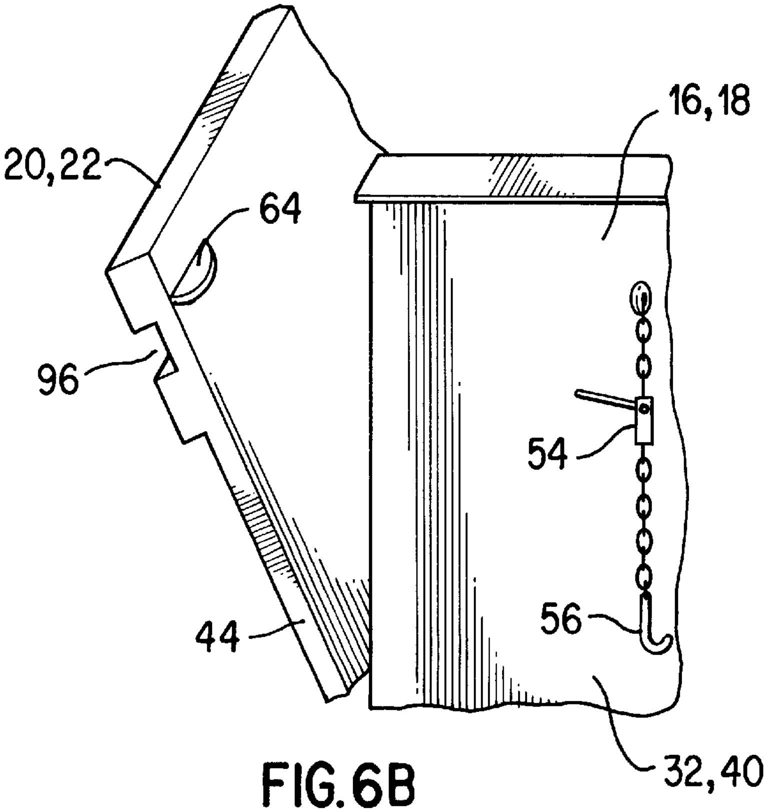

FIGS. 6A and 6B show the details of a locking compression mechanism 54 and a guide 64. The locking compression mechanism 54 is attached to outside surfaces 32. The hook 56 of the locking mechanism 54 is placed in notch 96 located on side edge 44 of wall 20. When locking compression mechanism 54 is tightened, the walls 16 and 20 are held together. The guide 64 is designed such that the first wall with the locking compression mechanism 54 must be in the closed position before the wall with the guide 64 can be moved to the closed position. The guide 64 also acts to keep the wall with the locking compression mechanism 54 from moving out of the closed position accidentally.

Figure 7:
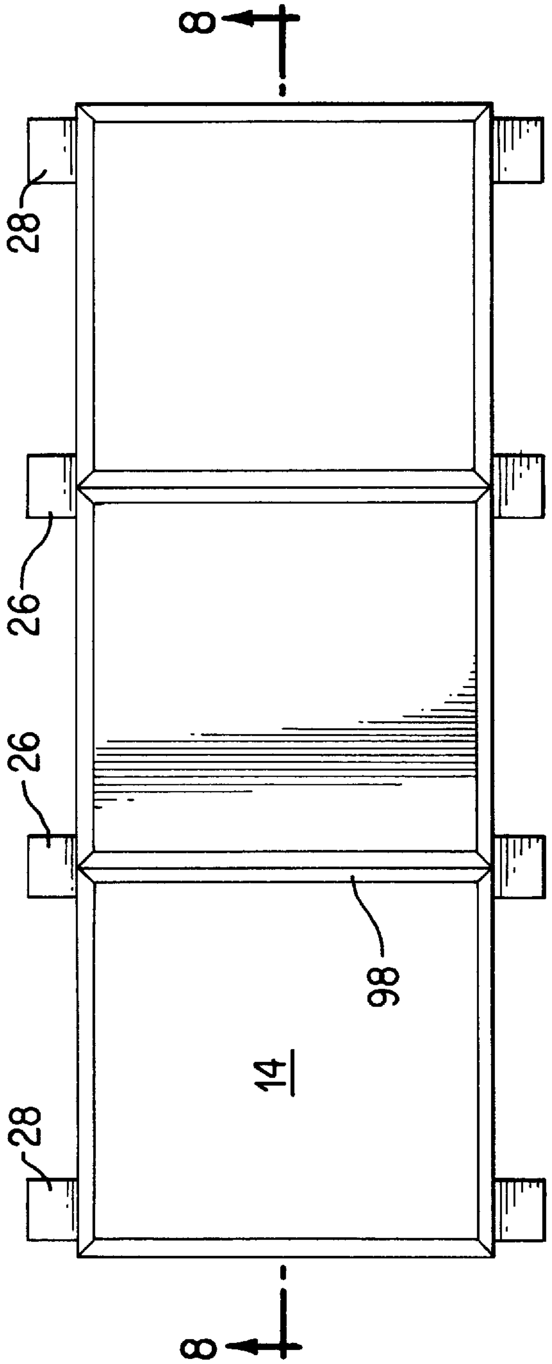
FIG. 7 shows a top view of the mold base.

FIG. 7 shows a top view of the base 14. On base 14 are bevels 98 that protrude away from base 14. FIG. 7 also shows the outer footings 28 and the inner footings 26. The section 8—8 is shown in FIG. 8.

Figure 8:
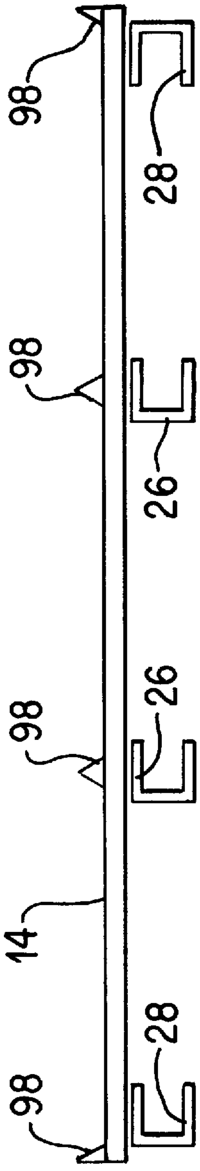
FIG. 8 shows a section view of the mold base.

FIG. 8 shows the section 8—8 from FIG. 7. Section 8—8 is of base 14, bevels 98, outer footings 28 and inner footings 26. Bevels 98 protrude away from base 14.

Figure 9:
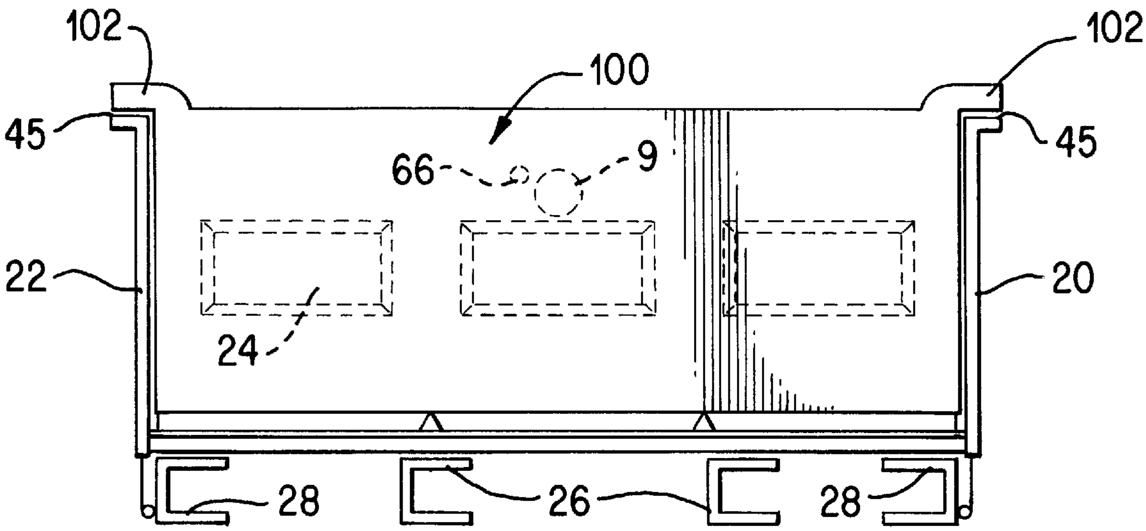
FIG. 9 shows a sectional view of the mold with an insert.

FIG. 9 shows the section 9—9 from FIG. 1 with mold insert 100 in place. Mold insert 100 is placed against the inside surface 38 of wall 18, modifying the pattern of the mold. The original pattern of wall 18, pattern 74, is represented by hidden lines, along with the plunger head 90. Pin holders 70 are not represented because the pin holders 70 would be removed to allow the mold insert 100 to rest against wall 18. Specifically, mold insert 100 leaves a flat surface on a block formed in the mold 10. Mold insert 100 covers the entire inside surface 38 exposed in mold cavity 12. Mold insert 100 also has ears 102 which rest on top edges 45 of walls 20 and 22. The ears 102 aid in placement and removal of the mold insert 100. Other patterns can be incorporated into a mold insert.

Figure 10A:
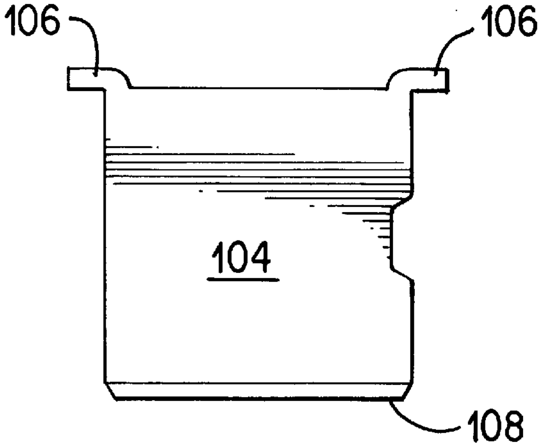
FIGS. 10A and 10B show a front and side view of an insert.
Figure 10B:
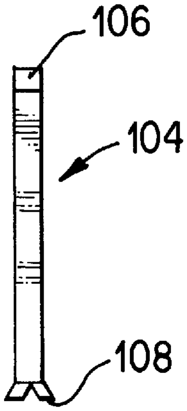

FIGS. 10A and 10B show mold insert 104. Mold insert 104 is designed to be placed in mold 10 such that the ears 106 rest on walls 16 and 18. Additionally, the edges of mold insert 104 are designed to conform to the inside surface 30 and 38, base 14 and bevels 98. Additionally, the bottom edge 108 of the mold insert 104 is split to rest on bevel 98 running underneath mold insert 104 when placed in mold 10.

Figure 11:
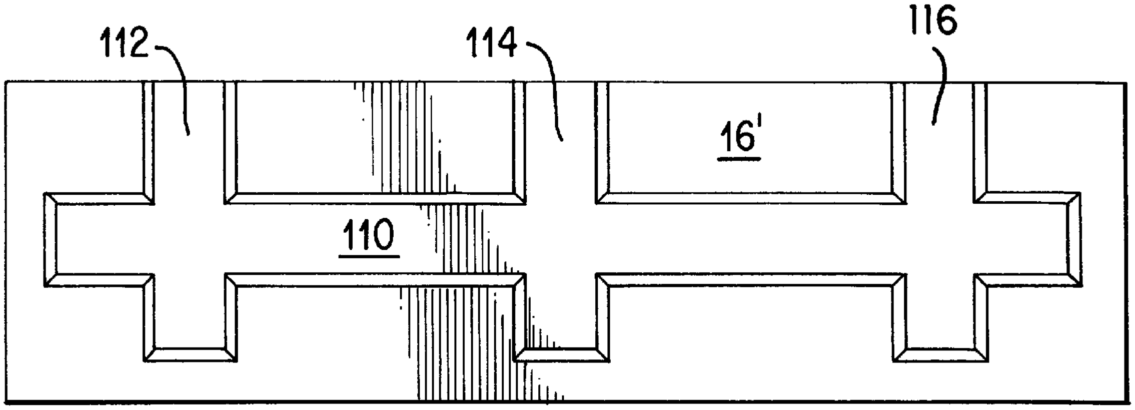
FIGS. 11, 12, and 13 show alternate wall designs.
Figure 12:
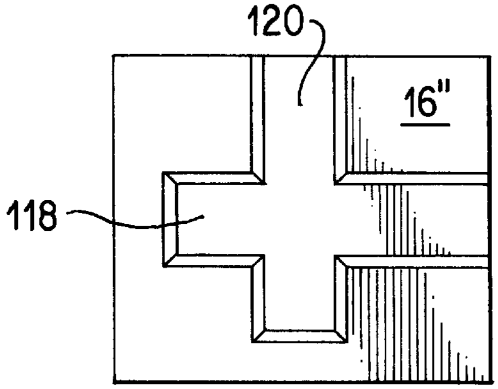
Figure 13:
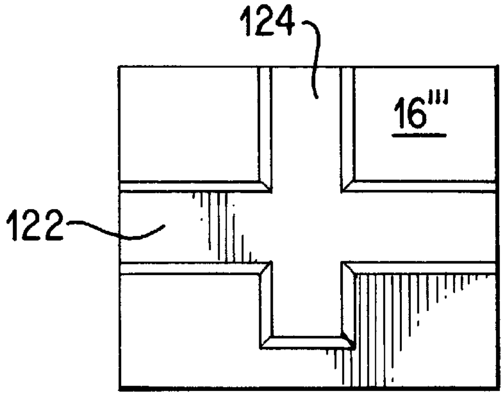

FIGS. 11, 12, and 13 show alternative pattern configurations for wall 16. FIG. 11 shows a pattern comprised of four ridges on wall 16'. Ridge 110 running substantially midway between the top and the bottom of wall 16' but not extending completely across wall 16'. Ridges 112, 114, and 116 are parallel to each other and perpendicular to ridge 110, running from the top of wall 16' and almost to the bottom of wall 16', substantially trisecting wall 16' into equal parts.

FIG. 12 shows a pattern for wall 16" which is for a mold of one segment instead of three. Mold 10 is designed into 3 segments. The segmentation can be seen in FIGS. 1 and 2 by observing that wall 18 has a 3-repeat pattern. Also, the segmentation can be seen in FIG. 7 by observing the layout of the bevels 98 on base 14. A mold configuration is not limited to 3 segments. A mold can be configured to have 1 or more segments. FIG. 12 shows a pattern for a 1 segment wall comprising ridges 118 and 120. Ridge 118 runs substantially midway between the top and the bottom of wall 16". Additionally, ridge 118 only extends to one side of wall 16". Ridge 120 runs from the top to the bottom of wall 16 and substantially through the middle of the face of wall 16". Additionally, ridges 118 and 120 only extend to one side of wall 16".

FIG. 13 shows wall 16'", also for a 1 segment mold. The pattern in wall 16'" is comprised of ridges 122 and 124. Ridge 122 runs substantially midway between the top and the bottom of wall 16'". Ridge 122 runs completely across wall 16'". Ridge 124 runs from the top to the bottom of wall 16'". Additionally, ridge 124 runs to the top of wall 16'" but not completely to the bottom of wall 16'". The purpose of the ridges not extending to the edge of the wall is so the block formed in the mold can have solid sides as opposed to sides interrupted by the end of the ridge.

It will be understood that many modifications may be made by those skilled in the art without departing from the present inventive concept.

Thus, the mold embodying the invention may be made in a wide variety of sizes. Additionally, the contours on the walls and base of the mold may also take a wide variety of designs. Accordingly, it is desired that the scope of the invention be limited only by the appended claims.

What is claimed is:

1. A mold insert to modify a mold with an inside surface and a top edge comprising:

a side edge which substantially conforms to the inside surface of the mold;

a top edge which extends at least as high as the top edge of mold; and an ear protruding above and beyond each end of the top edge of the mold insert and adapted to rest on the top edge of the mold.

2. The mold insert of claim 1 wherein:

the mold insert is designed to rest against the inside surface of at least part of the mold, thus modifying the face of a block formed in the mold.

3. The mold insert of claim 1 wherein:

the insert is constructed and arranged to segment the mold cavity.

4. A mold comprising:

a base with a top surface and a plurality of side surfaces;

a plurality of walls equal in number to the plurality of base side surfaces, each wall having an inside surface and an outside surface, with each wall attached to one base side surface and having at least one adjacent wall, where at least one wall is pivotally attached such that the pivotally attached wall can move between a block release position and a closed position, and when the walls are in the closed position, the top surface of the mold base and the inside surfaces of the walls define a mold cavity; and means for separating a pivotally attached wall from the material in the mold;

the separating means comprising:

at least one plunger comprising a rod extending through a pivotally attached wall, a plate attached substantially perpendicular to the end of the rod adjacent to the inside wall surface, a spring attached to the opposite end of the rod and cooperating with the outside surface of the wall, the spring being constructed and arranged to exert pressure urging the plate against the inside wall surface thereby preventing the rod from passing completely through the wall, and the plunger responsive to opposing pressure to urge the plate away from the inside wall surface.

5. The mold of claim 4, further comprising a lever; and a plurality of arches, equal in number to the amount of plungers, with one arch mounted on the outside wall surface above each plunger, adapted to have the lever inserted through the arch, making contact with the end of the plunger and the arch, using the end of the plunger as a fulcrum to move the arch and the pivotally attached wall away from the material in the mold.

* * * * *